Aug. 9, 1966  R. A. BAUDRY  3,265,912
DYNAMOELECTRIC MACHINE
Filed June 15, 1964  2 Sheets-Sheet 1
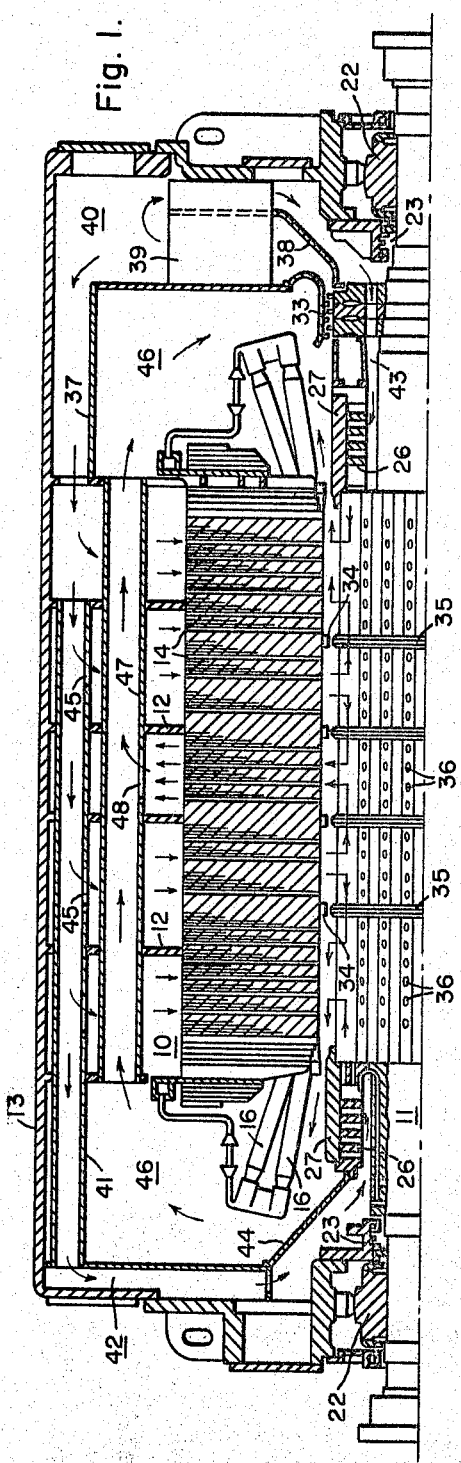
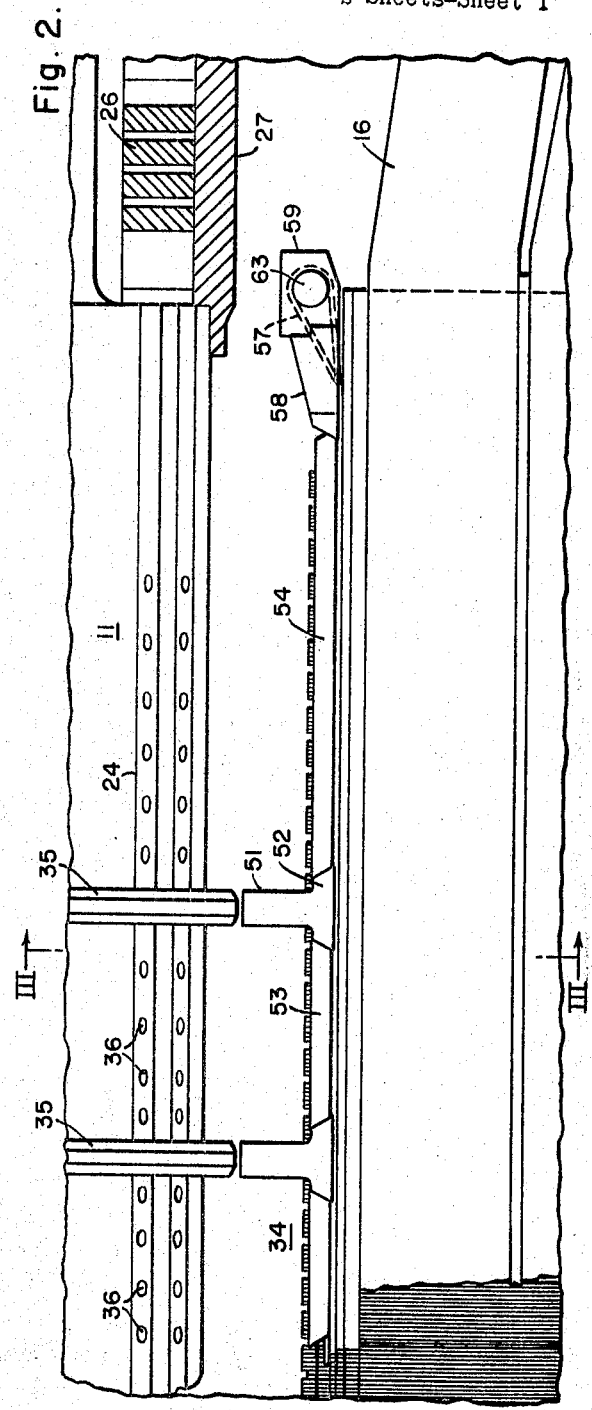
INVENTOR
René A. Baudry.
BY
ATTORNEY

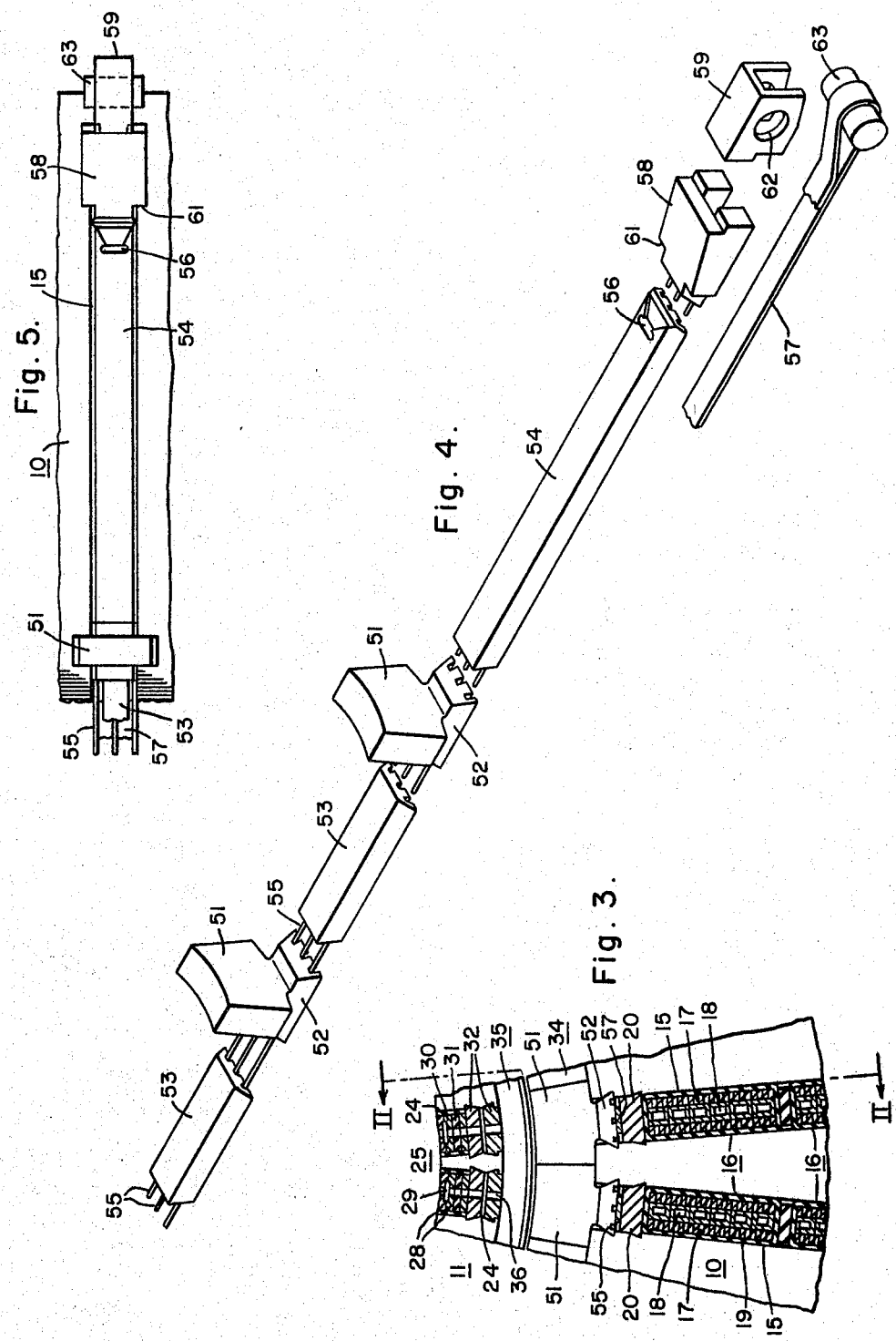

3,265,912
DYNAMOELECTRIC MACHINE
René A. Baudry, Pittsburgh, Pa., assignor to Westinghouse Electric Corporation, East Pittsburgh, Pa., a corporation of Pennsylvania
Filed June 15, 1964, Ser. No. 374,934
8 Claims. (Cl. 310—59)

The invention relates, generally, to the ventilation of dynamoelectric machines and, more particularly, to the construction of turbine generators of large size.

Large turbine generators are usually of the inner cooled construction in which a coolant gas, usually hydrogen, is circulated through ducts in the stator and rotor slots in direct thermal relation with the current-carrying conductors inside the ground insulation. A machine of this type having an improved ventilation system for greatly improving the cooling of the rotor is disclosed and claimed in U.S. Patent No. 3,110,827, issued November 12, 1963, to R. A. Baudry.

As described in this patent, more effective cooling of a large turbine generator is obtained by dividing the air gap transversely into a plurality of annular zones by baffle members disposed in the air gap and mounted on the rotor and the stator core. Alternate zones are connected to the high pressure or discharge side of a blower mounted on the rotor shaft and the remaining zones are connected to the low pressure or entrance side of the blower. Radial ducts or passages in the rotor in each zone permit the coolant gas to flow from the high pressure zones to the low pressure zones through the longitudinal ducts of the rotor winding. Thus, the blower pressure is used to force the gas through the rotor ducts in a plurality of short axial paths so that adequate gas flow is obtained and very effective cooling results.

One of the problems in the design of such a machine is the provision of a suitable system of baffles or barriers in the air gap. Such a system must be capable of withstanding the vibration and other forces occurring during operation of the machine and must be capable of operation at high temperature in hydrogen. The barrier system must be such that it can be installed without difficulty and with close clearance between the stator and rotor baffles to minimize gas leakage between adjacent zones of the air gap. The rotor baffles or barriers may be rings of non-magnetic material shrunk or otherwise secured on the rotor surface at appropriate places along the rotor. The stator baffles are aligned radially with the rotor baffles and, because of the small clearance, at least part of the stator baffles should be removable and arranged so that they can be installed or removed with the rotor in place in the machine. This is necessary to permit the rotor to be installed in the machine or removed therefrom by the usual procedures.

The principal object of the present invention, therefore, is to provide a dynamoelectric machine of the type described above which has a system of annular baffles or barriers in the air gap which meets all the requirements mentioned and which can readily be installed.

Another object of the invention is to provide a barrier system for a machine of the type described which includes baffles on the stator core which can be installed on the stator or removed therefrom with the rotor in place in the machine.

A further object of the invention is to provide a positive locking or retaining means for the baffles or barriers on the stator to insure satisfactory operation while subjected to generator core vibration during operation.

A still further object of the invention is to provide a preassembled row of spaced baffle or barrier members which can easily be installed as a unit in a slot in the stator core of a dynamoelectric machine and which forms a spaced series of annular baffles in cooperation with similar assemblies in the other slots.

In accordance with a preferred embodiment of the invention, a barrier system for the air gap of a dynamoelectric machine consists of rotating barriers and cooperating stationary barriers. A series of annular rotating barriers are positioned longitudinally along the rotor body to divide the air gap transversely into the pressure zones required by the cooling system. The rotating barriers are preferably non-magnetic steel rings shrunk on the rotor body. Annular stationary barriers are positioned along the bore of the stator core to align radially with the rotating barriers. Each stationary barrier ring comprises a plurality of segmental members each having a base disposed in a slot of the stator core. Each stator slot supports a complete barrier assembly comprising a row of longitudinally spaced barrier segments with spacing members between them, held together endwise by glass twine. The abutting ends of the spacers and the bases of the barrier segments are oppositely tapered in order that a compressive load, applied end-to-end, will wedge the entire assembly tightly in place. The compressive load is produced by putting a glass tape loop, which extends from one end of the row to the other end, under tension. A barrier assembly is placed in each slot of the core, and the corresponding segments of the different barrier assemblies abut each other circumferentially of the core to form an annular barrier.

For a better understanding of the nature and objects of the invention reference may be had to the following detailed description, taken in conjunction with the accompanying drawings, in which:

FIGURE 1 is a view in longitudinal section of the upper half of a generator embodying principal features of the invention;

FIG. 2 is an enlarged fragmentary view, partly in section and partly in elevation, of a portion of the lower half of the generator, the section being taken along the line II—II in FIG. 3;

FIG. 3 is a view, in section, taken along the line III—III in FIG. 2;

FIG. 4 is an exploded isometric view, of a portion of one of the stationary barrier assemblies for the stator of the generator; and FIG. 5 is a view, in plan, of a portion of the stator, showing a barrier segment, a spacer member and locking members in one slot of the stator core.

Referring to the drawings, and particularly to FIG. 1, the generator shown therein is of the type shown in the above-mentioned patent and comprises a stator core 10 and a rotor 11. The stator core is supported by frame rings 12 in a substantially gas-tight outer housing 13. The stator core 10 is a laminated annular core of the usual type having a cylindrical bore therethrough. The core 10 is built up of laminations arranged in spaced stacks to provide radial vent ducts 14 between them. The laminations of the core are clamped between suitable end plates in the usual manner.

As shown most clearly in FIGS. 3 and 5, the stator core 10 is provided with longitudinal slots 15 in its inner periphery for the reception of a stator winding which may be of any suitable type and may consist of a plurality of half coils 16 connected at their ends to form the winding. The stator winding is of the inner cooled construction and each half coil 16 consists of two stacks of conductor strands 17 which are lightly insulated and transposed in the usual manner, and which are separated by ducts 18 of high resistance metal which are lightly insulated from each other and from the conductor strands 17. The ducts 18 extend longitudinally from one end to the other of the half coil 16 for circulation of a coolant fluid in close thermal relation to the conductor strands 17. The half coil is enclosed in a heavy sheath of insulation 19 to provide the necessary high voltage insulation to ground. Two half coils are placed in each slot 15 of the stator core 10 and the slots are closed by suitable wedges 20. The ducts 18 extend out of the coils 16 at the ends and coolant fluid may be circulated through them in a closed recirculating system, as described in the above-mentioned patent, or in any other desired manner.

The rotor 11 is disposed in the bore of the stator core 10 and separated from the stator by an annular air gap. The rotor 11 is supported in bearings 22 mounted in the ends of the housing 13, and gland seals 23 are provided to prevent leakage of gas from the housing along the shaft. The rotor 11 is provided with longitudinal slots 24 in its periphery for the reception of a field winding 25. The conductors of the winding 25 extend longitudinally of the rotor and have circumferentially extending end turn portions 26 which are supported against centrifugal forces by retaining rings 27 of usual construction.

As shown in FIG. 3, the rotor winding 25 consists of a plurality of insulated turns each of which consists of two generally channel-shaped conductors 28 which are placed in face-to-face relation to form a longitudinal duct 29 extending from end to end of the rotor through the center of each turn of the winding. The winding 25 is insulated from the rotor core by insulating slot liners 30. A suitable insulating member 31 may be placed at the top of the winding in each slot 24 and the slot is closed by wedges 32. The ducts 19 thus extend from end to end of the rotor and provide for the circulation of coolant gas in direct thermal relation to the conductors 28.

As previously stated, the housing 13 of the machine is made as nearly gas-tight as possible, and is sealed at the points where the rotor shaft passes through it by the gland seals 23. The housing is filled with a suitable coolant gas, preferably hydrogen, which is utilized for cooling the rotor and the stator core. A blower 33 is mounted on the rotor shaft adjacent one end of the machine for circulating the gas therethrough. The blower 33 may be of any suitable type, such as a multi-stage blower of the axial flow type as shown in the drawing. The gas in the machine is maintained at a suitable static pressure, which may, for example, be from 30 to 75 pounds per square inch above atmospheric pressure. The blower 33 develops sufficient differential pressure to maintain the desired circulation of gas within the housing and through the various ducts in the manner described hereinafter.

As more fully described in the aforesaid patent, adequate gas flow through the ducts of the rotor winding is obtained by dividing the path of the gas through the ducts into a plurality of relatively short longitudinal paths, and the pressure of the blower 33 is utilized to cause the gas to flow through these short paths. For this purpose, the air gap is divided transversely into a plurality of annular zones. This is done by means of annular baffle or barrier members placed in the air gap and extending around the bore of the stator to form the annular zones. Adjacent zones are maintained at different gas pressures to cause the gas to flow from one zone to the next through the rotor ducts.

A plurality of annular baffles 34 are mounted on the stator core and corresponding annular baffles 35 are mounted on the periphery of the rotor. The rotating baffles or barriers 35 may be non-magnetic steel rings shrunk on the rotor body and, if desired, locked in place by any suitable means. The structure of the stationary baffles 34 will be described more fully hereinafter. The baffles 34 and 35 are radially aligned with each other with a small running clearance between the stator and rotor baffles. Thus, the baffles divide the air gap transversely into a plurality of annular zones, five such zones being shown.

The rotor 11 is provided with radial gas passages in each of the zones of the air gap. Thus, as shown in FIG. 3, radial holes 36 may be drilled through the wedges 32 and through the conductors 28 in each slot of the rotor to provide radial passages from the air gap communicating with the longitudial gas ducts 29 of the rotor winding. Several of these gas passages 36 may be provided in each slot of the rotor in each of the zones of the air gap, as shown in FIGS. 1 and 2, so that gas may flow from one zone of the air gap to an adjoining zone through the radial passages and longitudinal ducts of the rotor conductors. This flow of gas is effected by connecting alternate zones of the air gap to the high pressure side of the blower 33 and connecting the remaining zones to the low pressure side of the blower, thereby maintaining a pressure differential between adjacent zones of the air gap to cause the desired gas flow through the rotor ducts.

The necessary gas flow in the housing 13 may be effected by suitable baffling in any desired manner. In the illustrated embodiment, a generally cylindrical baffle member 37 is provided adjacent the blower 33 to separate the entrance side of the blower from the discharge side. The high pressure gas discharged from the blower is directed by a conical baffle 38 to flow through coolers 39 of any suitable type into a high pressure zone 40 in the end of the housing, and gas from the high pressure zone 40 flows through ducts 41 to another high pressure zone 42 at the opposite end of the housing. Gas from the high pressure zone 40 is also directed by the baffle 38 to flow through passages 43 under the blower 33 to the end turns 26 of the rotor winding and thus into the ends of the gas ducts 29 at that end of the rotor. Gas from the high pressure zone 42 at the opposite end of the machine is similarly directed by a conical baffle 44 to flow over the end turns 26 of the rotor winding at that end of the machnie and into the ducts 29 at that end of the rotor.

High pressure gas is also supplied through openings 45 in the ducts 41 to certain of the annular spaces formed on the outside of the stator core 10 by the frame rings 12. Thus, high pressure gas is supplied to the two end annular spaces at both ends of the core, but is prevented from flowing to the central annular space. The high pressure gas in these annular spaces flows through the radial vent ducts 14 of the core 10 to the air gap, thereby cooling the core and flowing into the air gap. It will be noted that the number of annular spaces on the outside of the core corresponds to the number of annular zones of the air gap. The end zones of the air gap are of course open at the ends of the core and communicate with low pressure zones 46 at each end of the machine. The low pressure zones 46 are connected by ducts 47 and communicate directly with the entrance or low pressure side of the blower 33. Thus, the two end zones of the air gap are connected to the entrance side of the blower 33. The center zone of the air gap is connected through the radial vent ducts 14 of the stator core to the central annular space around the outside of the core which, in turn, is connected to the low pressure side of the blower by openings 48 in the ducts 47.

It will be seen that with the air gap divided into five zones as shown, the center and end zones of the air gap are connected to the low pressure side of the blower while the remaining two zones are connected to the high pressure side of the blower. Thus, alternate zones of the air gap are connected to a high pressure source of coolant gas while the remaining zones are connected to a region of lower pressure. It will be understood that any suitable number of zones may be provided. Thus, in a longer machine more than five zones may be provided and connected alternately to the high pressure and low pressure sides of the blower by suitable baffling and ducts, while in a shorter machine, three zones might be sufficient.

The circulation of gas in the machine is indicated by the arrows in FIG. 1 and is described in detail in the aforesaid patent. As shown by the arrows, the coolant gas flows longitudinally through the rotor in a plurality of relatively short paths and adequate gas flow is obtained by making use of the blower pressure to force the gas to flow through the rotor from the high pressure zones of the air gap to the adjacent low pressure zones. In this way, very effective cooling of the rotor is obtained regardless of its length.

As previously described, the division of the air gap into the annular zones is effected by baffle members 34 and 35 mounted on the stator and the rotor, respectively. As also previously stated, the rotor baffles or barriers 35 may be rings of non-magnetic material shrunk or otherwise secured on the rotor surface at the appropriate places.

In order to minimize leakage of gas directly between adjacent zones of the air gap, the clearance between the stationary barriers 34 and the rotating barriers 35 must be made quite small. Provision must be made, however, for installing the rotor in the machine without damaging the barriers, and for removing the rotor if necessary. For this reason, the stator barriers are so designed that they can be installed after the rotor is in place, and are easily removable, at least at the bottom of the core, to permit a skid to be inserted. Thus, the rotor can be installed or removed by the usual procedures without interference by the barriers and without risk of damage to the barriers.

Each of the stator barriers 34 consists of a plurality of segmental barrier members 51 each having a wedge or dovetailed base 52 for insertion into one of the stator core slots 15. The segments 51 of each stationary barrier 34 abut each other circumferentially of the stator core to form a complete annular barrier. As shown in FIGS. 4 and 5, each stator coil slot 15 supports a barrier assembly comprising a plurality of longitudinally spaced barrier segments 51 with spacer members 53 disposed between the bases 52 of the segments 51. The number of segments in each stationary barrier ring is thus equal to the number of stator coil slots 15.

The barrier segments 51 should be made of a material capable of withstanding continuous operation at temperatures of the order of 80° C. in a hydrogen atmosphere. Furthermore, the barriers should be made from a nonmetallic material in order to prevent excessive eddy current heating, and should have low moisture absorption, creepage rate, and shrinkage. Glass melamine or glass epoxy are suitable materials for fabricated and machined barrier segments or any of a number of available glass fiber filled resins can be used if the segments are molded. The spacer members 53 may be composed of a substantially rigid insulating material, such as "Micarta."

As shown in FIG. 4, the barrier segments 51, spacer members 53 and end spacers 54 of each assembly are held together in a row by strings of glass twine 55. Three parallel glass twine ties are preferably used and they are cemented into slots on the underside of the barrier segments and the spacers. Thus, all the barrier parts for each slot of the stator core are held together in a single row which can easily be pulled into the slot. A gap of approximately 1/32 inch should be allowed between the spacers and the segments for a limited amount of flexibility during assembly.

In order to permit the assembled row of segments and spacers to be pulled into a stator slot after the rotor is in place in the machine, a recess 56 may be provided at one end of the end spacer 54. A suitable plug (not shown) may be temporarily inserted in the recess 56. The assembled row of parts is placed in a suitable tray which is aligned with the stator slot at one end of the machine. A dragline, such as an electrician's "fish" line, is inserted through the slot from the other end of the machine. The dragline is attached to the plug in the recess 56 and the row of assembled parts is then pulled from the tray into the slot. The dragline and the plug are then removed.

Referring to FIG. 4, it will be seen that the abutting ends of the bases 52 of the segments 51 and the spacers 53 and 54 are oppositely tapered. Thus, when an axial compressive load is applied on the members, the spacers tend to override the barrier segment bases, thereby producing a tightening force which wedges the barriers in the slot, ensuring satisfactory operation while subjected to generator core vibration since the barriers are positively locked in place. Thus, the spacers have two functions. First, they position the stationary barrier members in radial alignment with the rotating barrier members and, second, they tighten the segmental barrier members in the core slots.

In order to apply the axial compressive load on the barrier members, a glass tape loop 57 is installed in each stator slot underneath the barrier segments and the spacers. Also, a locking block 58 and an end block 59 are provided at each end of each slot. As shown in FIGS. 4 and 5, the locking block 58 has protrusions or shoulders 61 thereon which engage the stator core 10. The end block 59 has an opening 62 therethrough for receiving a dowel pin 63. The locking block 58 and the end block 59 are both generally channel-shaped to permit them to straddle the tape loop 57.

After the row of barrier segments 51 and spacers 53 and 54 is pulled into the stator slot, a locking block 58 and an end block 59 are installed at one end of the stator slot with a dowel pin 63 inserted in the opening 62 and through one end of the tape loop 57. The ends of the tape are bonded together to form a closed loop. An end block 59 is placed at the other end of the slot with a dowel pin 63 inserted through the other end of the tape loop. The length of the tape loop is made less than that of the barrier assembly. Therefore, the tape has to be stretched to permit the other locking block 58 to be installed. The tape may be stretched by utilizing a tool of any suitable type which engages the dowel pin 63 and is inserted in the recess 56 in the end spacer 54 to apply a stretching force to the tape. The tape is stretched sufficiently to permit the locking block 58 to be inserted after which the tool is removed. The tensile force in the tape creates a sufficient compressive load in the barrier assembly to tighten and lock the assembly in the slot. In this manner, a row of assembled barrier segments is installed in each slot of the stator and it will be seen that this can easily be done after the rotor is in place in the machine. The locking blocks 58 prevent axial movement of the assembly after it is installed in a slot.

The tape 57 may be any suitable elastic material which can be sufficiently stretched. Glass fiber tape impergnated with a polyester resin has been found to be very suitable. This material has great strength but can be stretched a substantial amount. Thus, for example, in a stator core 120 inches in length, the tape can be stretched approximately 0.75 inch and is then under a tensile load of 120,000 pounds per square inch which is well within its strength and applies sufficient compressive force to the barrier assembly to positively lock it in place in the manner described.

From the foregoing description, it is apparent that the invention provides an air gap barrier assembly which may be installed on the stator of a dynamoelectric machine after the rotor is in place in the machine. Positive locking means are provided for preventing movement of the barrier members while the machine is in operation. The clearance between the stationary barrier members and the rotating barrier members can easily be made small enough that zone-to-zone gas leakage is held to an acceptable value for satisfactory operation of the cooling system. If it is desired to remove the rotor, the barrier assemblies can readily be removed from some or all of the stator slots by reversing the procedure described above, and the rotor can then be removed by the use of a skid in the usual manner.

It will be apparent that various modifications may be made within the scope of the invention. Thus, if desired, the segments 51 of the stator barriers could be made wide enough to cover two or more slots, and supported in one or more of the slots, or the stator barriers could be complete rings with a number of dovetail supports locked in slots in the manner described.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

I claim as my invention:

1. In a dynamoelectric machine having a stator core with a cylindrical bore therethrough and a rotor disposed in the bore with an annular air gap between the stator core and the rotor, said stator core having a plurality of longitudinal slots therein, winding conductors disposed in the slots, a plurality of longitudinal slots on the periphery of the rotor, field winding conductors disposed in the rotor slots, annular rotor barriers spaced longitudinally on the surface of the rotor, stator barriers radially aligned with the rotor barriers to divide the air gap transversely into a plurality of annular zones, said stator barrier comprising annular structures extending around the bore of the stator core and having bases disposed in the slots of the stator core, said stator barriers being movable longitudinally of the stator core, and means in the stator slots for spacing said bases apart and locking the bases in position in the slots.

2. In a dynamoelectric machine having a stator core with a cylindrical bore therethrough and a rotor disposed in the bore with an annular air gap between the stator core and the rotor, said stator core having a plurality of longitudinal slots therein, winding conductors disposed in the slots, a plurality of longitudinal slots on the periphery of the rotor, field winding conductors disposed in the rotor slots, annular rotor barriers spaced longitudinally on the surface of the rotor, stator barriers radially aligned with the rotor barriers to divide the air gap transversely into a plurality of annular zones, each stator barrier comprising a ring of segmental members having bases disposed in the slots of the stator core, spacer means between the bases in each slot to position the segmental members longitudinally of the stator core, means for attaching the bases and spacer means in each slot to each other to permit all the segmental members of a slot to be moved along the slot simultaneously, and means for locking the bases in position in the slots.

3. In a dynamoelectric machine having a stator core with a cylindrical bore therethrough and a rotor disposed in the bore with an annular air gap between the stator core and the rotor, said stator core having a plurality of longitudinal slots therein, winding conductors disposed in the slots, a plurality of longitudinal slots on the periphery of the rotor, field winding conductors disposed in the rotor slots, annular rotor barriers spaced longitudinally on the surface of the rotor, stator barriers radially aligned with the rotor barriers to divide the air gap transversely into a plurality of annular zones, each stator barrier comprising a ring of segmental members having bases disposed in the slots of the stator core, spacer means between the bases in each slot to position the segmental members longitudinally of the stator core, the bases and spacer means in each slot being longitudinally movable therein, and means for applying a compressive force longitudinally of the bases and spacer means in each slot to lock them in position.

4. In a dynamoelectric machine having a stator core with a cylindrical bore therethrough and a rotor disposed in the bore with an annular air gap between the stator core and the rotor, said stator core having a plurality of longitudinal slots therein, winding conductors disposed in the slots, a plurality of longitudinal slots on the periphery of the rotor, field winding conductors disposed in the rotor slots, annular rotor barriers spaced longitudinally on the surface of the rotor, stator barriers radially aligned with the rotor barriers to divide the air gap transversely into a plurality of annular zones, each stator barrier comprising a ring of segmental members having bases disposed in the slots of the stator core, spacer means between the bases in each slot to position the segmental members longitudinally of the stator core, means for attaching the bases and spacer means in each slot to each other to permit all the segmental members of a slot to be moved along the slot simultaneously, and means for applying a compressive force longitudinally of the bases and spacer means in each slot to lock them in position.

5. In a dynamoelectric machine having a stator core with a cylindrical bore therethrough and a rotor disposed in the bore with an annular air gap between the stator core and the rotor, said stator core having a plurality of longitudinal slots therein, winding conductors disposed in the slots, a plurality of longitudinal slots on the periphery of the rotor, field winding conductors disposed in the rotor slots, annular rotor barriers spaced longitudinally on the surface of the rotor, stator barriers radially aligned with the rotor barriers to divide the air gap transversely into a plurality of annular zones, each stator barrier comprising a ring of segmental members having bases disposed in the slots of the stator core, spacer means between the bases in each slot to position the segmental members longitudinally of the stator core, the spacer means being adapted to engage the bases to hold them in place, means for attaching the bases and spacer means in each slot to each other to permit all the segmental members of a slot to be moved along the slot simultaneously, and elastic means disposed under the bases and spacer means in each slot for applying a compressive force longitudinally of the bases and spacer means to lock them in position.

6. In a dynamoelectric machine having a stator core with a cylindrical bore and a rotor disposed in the bore with an annular air gap between the stator core and the rotor, said stator core having longitudinal slots for winding conductors, barrier means in the air gap to divide the air gap transversely into a plurality of annular zones, said barrier means comprising spaced annular barrier members on the surface of the rotor and radially aligned barrier members on the stator core, each of the barrier members on the stator core consisting of a ring of segmental members having bases disposed in slots of the stator core, means in the slots for positioning the bases longitudinally of the stator core, the segmental members of at least some of the slots being movable together longitudinally of the slot, and means for locking the bases in position in the slots.

7. In a dynamoelectric machine having a stator core with a cylindrical bore and a rotor disposed in the bore with an annular air gap between the stator core and the rotor, said stator core having longitudinal slots for winding conductors, barrier means in the air gap to divide the air gap transversely into a plurality of annular zones, said barrier means comprising spaced annular barrier members on the surface of the rotor and radially aligned barrier members on the stator core, each of the barrier members on the stator core consisting of a ring of segmental members having bases disposed in slots of the stator core, spacer members in the slots for positioning the bases longitudinally of the slots, the spacer members being adapted to engage the bases to hold them in place, means for attaching all the bases and spacer members in a slot to each other to enable them to be moved simultaneously longitudinally of the slot, and means for applying a longitudinal compressive force to the bases and spacer members in each slot to lock them in position.

8. In a dynamoelectric machine having a stator core with a cylindrical bore and a rotor disposed in the bore with an annular air gap between the stator core and the rotor, said stator core having longitudinal slots for winding conductors, barrier means in the air gap to divide the air gap transversely into a plurality of annular zones, said barrier means comprising spaced annular barrier members on the surface of the rotor and radially aligned barrier members on the stator core, each of the barrier members on the stator core consisting of a ring of segmental members having bases disposed in slots of the stator core, spacer members in the slots for positioning the bases longitudinally of the slots, the spacer members being adapted to engage the bases to hold them in place, means for attaching all the bases and spacer members in a slot to each other to enable them to be moved simultaneously longitudinally of the slot, an elastic member disposed under the bases and spacer members in each slot, and means at the ends of the slot for stretching said elastic member to apply a longitudinal compressive force to the bases and spacer members to lock them in position.

References Cited by the Examiner

UNITED STATES PATENTS 3,110,827  11/1963  Baudry _____ 310—55

MILTON O. HIRSHFIELD, *Primary Examiner.*

ORIS L. RADER, *Examiner.*

L. L. SMITH, *Assistant Examiner.*